US010018890B2

(12) United States Patent
Toriumi

(10) Patent No.: US 10,018,890 B2
(45) Date of Patent: Jul. 10, 2018

(54) IMAGING APPARATUS, IRIS DEVICE AND IMAGING METHOD

(71) Applicant: SONY CORPORATION, Tokyo (JP)

(72) Inventor: Yoichi Toriumi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/123,717

(22) PCT Filed: Feb. 27, 2015

(86) PCT No.: PCT/JP2015/055744
§ 371 (c)(1),
(2) Date: Sep. 6, 2016

(87) PCT Pub. No.: WO2015/137148
PCT Pub. Date: Sep. 17, 2015

(65) Prior Publication Data
US 2017/0017135 A1    Jan. 19, 2017

(30) Foreign Application Priority Data

Mar. 14, 2014  (JP) ................................ 2014-051897

(51) Int. Cl.
*G03B 9/06* (2006.01)
*G03B 11/00* (2006.01)
(Continued)

(52) U.S. Cl.
CPC .............. *G03B 9/06* (2013.01); *G02B 5/005* (2013.01); *G03B 7/00* (2013.01); *G03B 11/00* (2013.01);
(Continued)

(58) Field of Classification Search
CPC .................. G03B 9/06; G02B 5/005
See application file for complete search history.

(56) References Cited

U.S. PATENT DOCUMENTS 6,102,554 A * 8/2000 Wynne Willson ...... F21S 10/02
359/889
2002/0003583 A1 * 1/2002 Arai .................... H04N 5/2254
348/363
(Continued)

FOREIGN PATENT DOCUMENTS

| JP | 64-39180 A | 2/1989 |
|---|---|---|
| JP | 10-42303 A | 2/1998 |
| JP | 2003-134533 A | 5/2003 |

OTHER PUBLICATIONS

International Search Report and Written Opinion of PCT Application No. PCT/JP2015/055744, dated Apr. 14, 2015, 4 pages of English Translation and 3 pages of ISRWO.
International Preliminary Report on Patentability of PCT Application No. PCT/JP2015/055744, dated Sep. 14, 2016, 4 pages.

*Primary Examiner* — Cynthia Segura
(74) *Attorney, Agent, or Firm* — Chip Law Group

(57) ABSTRACT

The present disclosure relates to an imaging apparatus, an iris device, an imaging method, and a program that are capable of performing multispectral imaging in a small mechanism. The imaging apparatus includes: an image sensor that captures an image of a subject; an optical system that forms an image on the image sensor with light from the subject; and an iris mechanism that restricts the amount of light passing through the optical system. The iris mechanism includes aperture blades that adjust a size of an aperture causing the light from the subject to pass through the aperture, and an optical filter that is provided to at least one of the aperture blades and transmits light having a predetermined wavelength. The aperture blades are driven to positions where the aperture has a predetermined size, in a state where the optical filter provided to the at least one of the aperture blades is hidden by one of the aperture blades other than the aperture blade of the optical filter. The aperture blades provided with predetermined optical filters are driven such that the predetermined optical filters sequen- (Continued)

tially cover the aperture at predetermined timings. The present technology can be applied to, for example, an imaging apparatus including an iris mechanism.

14 Claims, 10 Drawing Sheets

(51) Int. Cl.
| | |
|---|---|
| *H04N 5/225* | (2006.01) |
| *G02B 5/00* | (2006.01) |
| *G03B 7/00* | (2014.01) |
| *H04N 5/238* | (2006.01) |
| *H04N 5/33* | (2006.01) |
| *H04N 5/232* | (2006.01) |
| *G03B 33/08* | (2006.01) |

(52) U.S. Cl.
CPC .......... *G03B 33/08* (2013.01); *H04N 5/2253* (2013.01); *H04N 5/2254* (2013.01); *H04N 5/238* (2013.01); *H04N 5/23245* (2013.01); *H04N 5/332* (2013.01)

(56) References Cited

U.S. PATENT DOCUMENTS

| | | | |
|---|---|---|---|
| 2007/0047803 A1* | 3/2007 | Nikkanen | H04N 9/735 382/162 |
| 2007/0065135 A1* | 3/2007 | Takei | G03B 7/003 396/241 |
| 2007/0154207 A1* | 7/2007 | Saito | G02B 5/005 396/505 |
| 2010/0181463 A1* | 7/2010 | Ide | G01J 1/04 250/205 |
| 2011/0205651 A1* | 8/2011 | Yamano | G02B 5/005 359/894 |
| 2011/0280013 A1* | 11/2011 | Tafas | G02B 21/06 362/232 |
| 2013/0306880 A1* | 11/2013 | Yamano | A61B 1/0646 250/458.1 |
| 2015/0029312 A1* | 1/2015 | Paik | H04N 5/2254 348/46 |
| 2015/0309225 A1* | 10/2015 | Moore | G02B 23/00 359/634 |
| 2016/0341372 A1* | 11/2016 | Shim | F21V 9/16 |
| 2017/0054953 A1* | 2/2017 | Toriumi | G03B 11/00 |

* cited by examiner

IMAGING APPARATUS, IRIS DEVICE AND IMAGING METHOD

CROSS REFERENCE TO RELATED APPLICATIONS

This application is a U.S. National Phase of International Patent Application No. PCT/JP2015/055744 filed on Feb. 27, 2015, which claims priority benefit of Japanese Patent Application No. 2014-051897 filed in the Japan Patent Office on Mar. 14, 2014. Each of the above-referenced applications is hereby incorporated herein by reference in its entirety.

TECHNICAL FIELD

The present disclosure relates to an imaging apparatus, an iris device, an imaging method, and a program, and particularly to, an imaging apparatus, an iris device, an imaging method, and a program that are capable of performing multispectral imaging in a small mechanism.

BACKGROUND ART

In the past, solid-state image sensors have been configured to include color filters of three primary colors, i.e., red, green, and blue, which are disposed on a pixel-by-pixel-basis according to the Bayer array, for example. In the solid-state image sensors, the pixels receive light of the colors divided by the respective color filters, so that images of the three primary colors can be captured.

In contrast to this, for example, the following imaging apparatus is developed, in which pixels receive light divided into more colors than the three primary colors, so that images of the respective colors (hereinafter, referred to as multispectral images as appropriate) can be captured.

For example, an imaging apparatus that adopts a light division system is developed. Such an imaging apparatus includes a plurality of image sensors, and divides light with a beam splitter, to capture multispectral images with light having colors passing through color filters fixed to the respective image sensors. Further, for example, an imaging apparatus that adopts a time-division system is developed. Such an imaging apparatus includes color filters disposed in front of one image sensor so as to be mechanically switchable, and sequentially switches those color filters, to capture multispectral images.

Incidentally, Patent Document 1 discloses an imaging apparatus, which simultaneously captures parallax images in a single optical system, has a configuration in which filters are mounted to iris blades, for example. However, Patent Document 1 does not disclose a configuration of driving those filters in a time-division manner.

Patent Document 1: Japanese Patent Application Laid-open No. 2003-134533

SUMMARY OF INVENTION

Problem to be Solved by the Invention

The imaging apparatus that adopts the light division system as described above needs to include image sensors corresponding to the number of divisions of light, which leads to concerns about increases in size of the apparatus and in costs. Additionally, the number of multi-layer films is increased, which makes it difficult to satisfy the precision of the specifications. Further, the imaging apparatus that adopts the time-division system as described above also needs to include a mechanism to switch the color filters by a rotary system, a slide system, or the like. This leads to concerns about not only an increase in size of the apparatus but also an increase in power consumption, which becomes a cause of a failure due to wear or the like.

For that reasons, there has been a demand for an imaging apparatus capable of achieving multispectral imaging in a small mechanism.

The present disclosure has been made in view of such circumstances and enables multispectral imaging in a small mechanism.

Means for Solving the Problem

According to one aspect of the present disclosure, there is provided an imaging apparatus including: an image sensor that captures an image of a subject; an optical system that forms an image on the image sensor with light from the subject; and an iris mechanism that restricts the amount of light passing through the optical system, the iris mechanism including aperture blades that adjust a size of an aperture causing the light from the subject to pass through the aperture, and an optical filter that is provided to at least one of the aperture blades and transmits light having a predetermined wavelength, the aperture blades being driven to positions where the aperture has a predetermined size, in a state where the optical filter provided to the at least one of the aperture blades is hidden by one of the aperture blades other than the aperture blade of the optical filter, the aperture blades provided with predetermined optical filters being driven such that the predetermined optical filters sequentially cover the aperture at predetermined timings.

According to one aspect of the present disclosure, there is provided an iris device, which restricts the amount of light passing through an optical system of an imaging apparatus, the imaging apparatus including an image sensor that captures an image of a subject and the optical system that forms an image on the image sensor with light from the subject, the iris device including: aperture blades that adjust a size of an aperture causing the light from the subject to pass through the aperture; and an optical filter that is provided to at least one of the aperture blades and transmits light having a predetermined wavelength, the aperture blades being driven to positions where the aperture has a predetermined size, in a state where the optical filter provided to the at least one of the aperture blades is hidden by one of the aperture blades other than the aperture blade of the optical filter, the aperture blades provided with predetermined optical filters being driven such that the predetermined optical filters sequentially cover the aperture at predetermined timings.

According to one aspect of the present disclosure, there is provided an imaging method for an imaging apparatus or a program causing a computer controlling the imaging apparatus to execute processing, the imaging apparatus including an image sensor that captures an image of a subject, an optical system that forms an image on the image sensor with light from the subject, and an iris mechanism that restricts the amount of light passing through the optical system, the iris mechanism including aperture blades that adjust a size of an aperture causing the light from the subject to pass through the aperture, and an optical filter that is provided to at least one of the aperture blades and transmits light having a predetermined wavelength, the imaging method or the processing including the steps of: driving the aperture blades to positions where the aperture has a predetermined size, in a state where the optical filter provided to the at least one of the aperture blades is hidden by one of the aperture blades other than the aperture blade of the optical filter; and driving the aperture blades provided with predetermined optical filters such that the predetermined optical filters sequentially cover the aperture at predetermined timings.

In one aspect of the present disclosure, in a state where the optical filter provided to the aperture blade is hidden by another aperture blade different from that aperture blade, the aperture blades are driven to positions where the aperture has a predetermined size, and the aperture blades provided with predetermined optical filters are driven such that the predetermined optical filters sequentially cover the aperture at predetermined timings.

Effects of the Invention

According to one aspect of the present disclosure, multispectral imaging can be performed in a small mechanism.

MODE(S) FOR CARRYING OUT THE INVENTION

Hereinafter, specific embodiments to which the present technology is applied will be described in detail with reference to the drawings.

Figure 1:
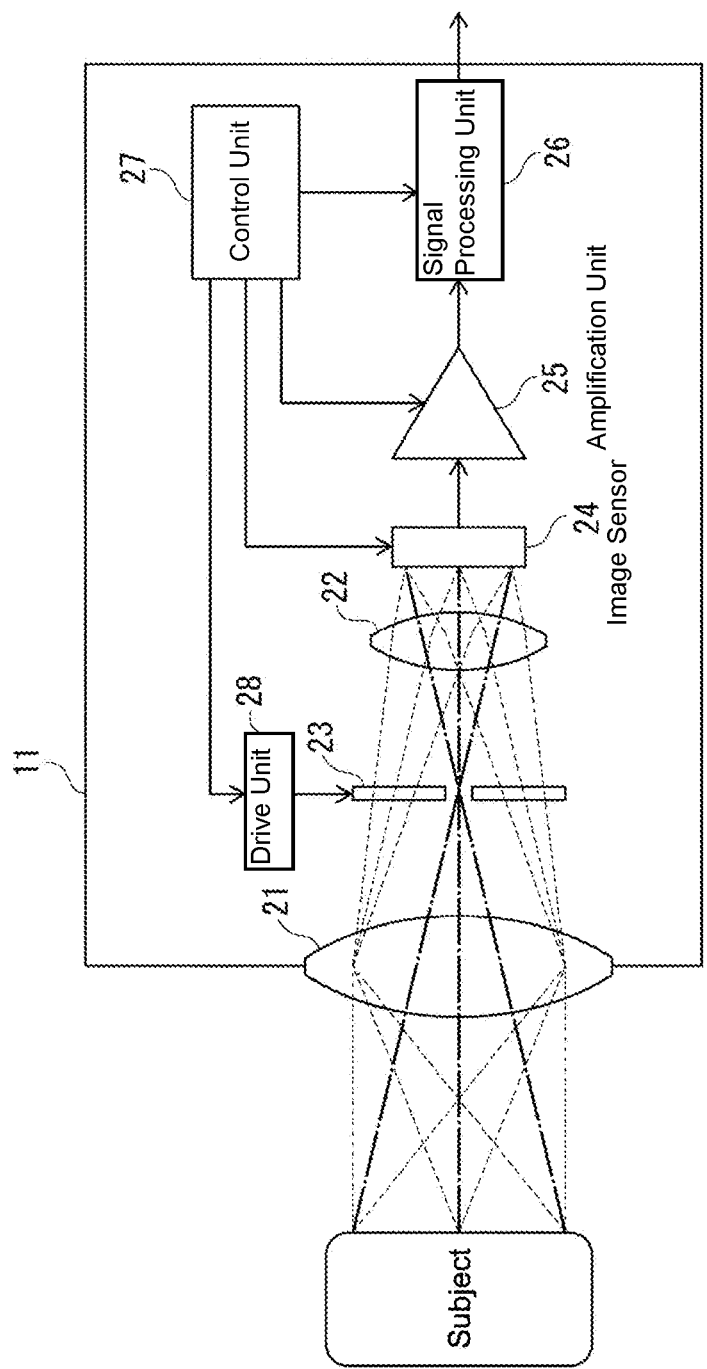
FIG. 1 is a block diagram of a configuration example of a first embodiment of an imaging apparatus, to which the present technology is applied.

FIG. 1 is a block diagram of a configuration example of a first embodiment of an imaging apparatus, to which the present technology is applied.

In FIG. 1, an imaging apparatus 11 includes a first optical system 21, a second optical system 22, an iris mechanism 23, an image sensor 24, an amplification unit 25, a signal processing unit 26, a control unit 27, and a drive unit 28. Further, as shown by dashed lines in FIG. 1, in the imaging apparatus 11, light from a subject serving as an imaging target is condensed by the first optical system 21 and the second optical system 22, so that an image of the subject is captured.

The first optical system 21 and the second optical system 22 constitute an optical system for condensing the light from the subject to form an image on a light-receiving surface of the image sensor 24. The first optical system 21 and the second optical system 22 include a plurality of lenses such as a focus lens, a zoom lens, a correction lens, and an image-forming lens. The first optical system 21 is disposed on the subject side relative to the iris mechanism 23. The second optical system 22 is disposed on the image sensor 24 side relative to the iris mechanism 23.

The iris mechanism 23 is disposed between the first optical system 21 and the second optical system 22 and restricts the amount of light passing through the optical system constituted by the first optical system 21 and the second optical system 22. For example, the iris mechanism 23 includes aperture blades (see FIG. 2 to be described later). By a change in size of an aperture formed by those aperture blades, the amount of light passing through the optical system can be adjusted.

The image sensor 24 is, for example, a CCD (Charge Coupled Device) or CMOS (Complementary Metal Oxide Semiconductor) image sensor. The image sensor 24 captures an image of a subject, the image being formed on the light-receiving surface on which a plurality of pixels is formed, and outputs resultant image signals. Further, the image sensor 24 can expose the pixels with the light that has passed through the optical system, to change an exposure time (shutter speed) during which photoelectric conversion is performed in the pixels. The image sensor 24 performs imaging for the exposure time according to the control of the control unit 27.

The amplification unit 25 amplifies the image signals, which are output from the image sensor 24, at an amplification factor according to the control of the control unit 27 and then supplies the image signals to the signal processing unit 26.

The signal processing unit 26 performs signal processing, such as white balance adjustment and gamma correction, on the image signals amplified by the amplification unit 25 and outputs the signals to a circuit in a subsequent stage (not shown).

The control unit 27 controls the blocks of the imaging apparatus 11 to perform imaging processing for capturing an image of the subject. For example, when a user operates an operation unit (not shown) to specify an imaging mode of the imaging apparatus 11, the control unit 27 performs control so as to capture an image in the specified imaging mode.

The drive unit 28 includes an actuator for driving the plurality of aperture blades constituting the iris mechanism 23, a mechanism for transmitting power of the actuator, and the like. The drive unit 28 drives those aperture blades according to the control of the control unit 27.

In the imaging apparatus 11 configured as described above, for example, when the user operates a shutter button, the control unit 27 causes the drive unit 28 to drive the iris mechanism 23 such that the iris mechanism 23 has an appropriate aperture corresponding to the brightness of the subject at that time, and causes the image sensor 24 to be exposed for a predetermined exposure time. With this configuration, the imaging apparatus 11 can capture an image of three primary colors corresponding to the color filters of RGB (three primary colors of red, green, and blue), which are disposed on the light-receiving surface of the image sensor 24 (hereinafter, referred to as normal imaging as appropriate).

Figure 2:
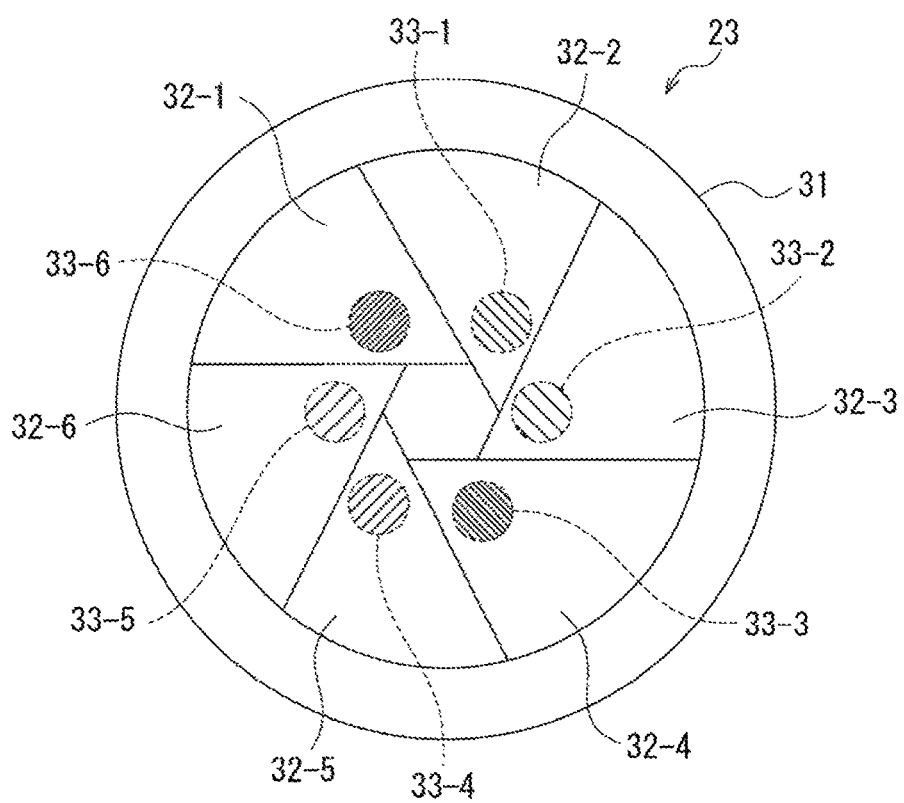
FIG. 2 is a diagram of a configuration of an iris mechanism.

Further, in addition to such normal imaging, the imaging apparatus 11 can capture a spectral image having colors more than the three primary colors (hereinafter, referred to as multispectral imaging as appropriate). Specifically, as shown in FIG. 2, aperture blades 32 constituting the iris mechanism 23 are provided with optical filters 33. The optical filters 33 transmit light in specific wavelength ranges. The imaging apparatus 11 can perform imaging with light having wavelengths that have passed through the respective optical filters 33.

Next, a configuration of the iris mechanism 23 will be described with reference to FIG. 2.

As shown in FIG. 2, the iris mechanism 23 includes an iris outer frame 31 and six aperture blades 32-1 to 32-6 attached to the iris outer frame 31. The six aperture blades 32-1 to 32-6 are provided with six optical filters 33-1 to 33-6, respectively. FIG. 2 shows the iris mechanism 23 in the smallest aperture state in which the aperture formed by the aperture blades 32-1 to 32-6 is closed to be the smallest aperture.

The iris outer frame 31 is provided with the aperture blades 32-1 to 32-6 to be openable and closable. The iris outer frame 31 is mounted to the imaging apparatus 11 such that the aperture formed by the aperture blades 32-1 to 32-6 is disposed on an optical axis of the first optical system 21 and the second optical system 22. Further, the iris outer frame 31 includes a storage space for storing the aperture blades 32-1 to 32-6 in the largest aperture state in which the aperture is opened to be the largest aperture. The iris outer frame 31 incorporates a mechanism for opening and closing the aperture blades 32-1 to 32-6.

The aperture blades 32-1 to 32-6 are driven in conjunction with one another from the largest aperture state to the smallest aperture state, to change the size of the aperture through which the light applied to the image sensor 24 passes. Further, when the aperture is in the smallest aperture state, the aperture blades 32-1 to 32-6 can be sequentially independently driven. For example, as will be described later with reference to FIG. 4, the aperture blades 32-1 to 32-6 are driven such that the optical filters 33-1 to 33-6 are sequentially disposed at the aperture in the smallest aperture state.

The optical filters 33-1 to 33-6 transmit light in a wavelength range that is narrower than wavelength ranges passing through the color filters of respective RGB colors, which are disposed on the light-receiving surface of the image sensor 24. Further, during a period from the largest aperture state to the smallest aperture state, the optical filters 33-1 to 33-6 are disposed at positions hidden by the aperture blades 32-1 to 32-6. In the normal imaging, light is prevented from passing through the optical filters 33-1 to 33-6. For example, the optical filter 33 provided to a predetermined aperture blade 32 is disposed at a position hidden by another aperture blade 32 adjacent to the predetermined aperture blade 32.

Figure 3:
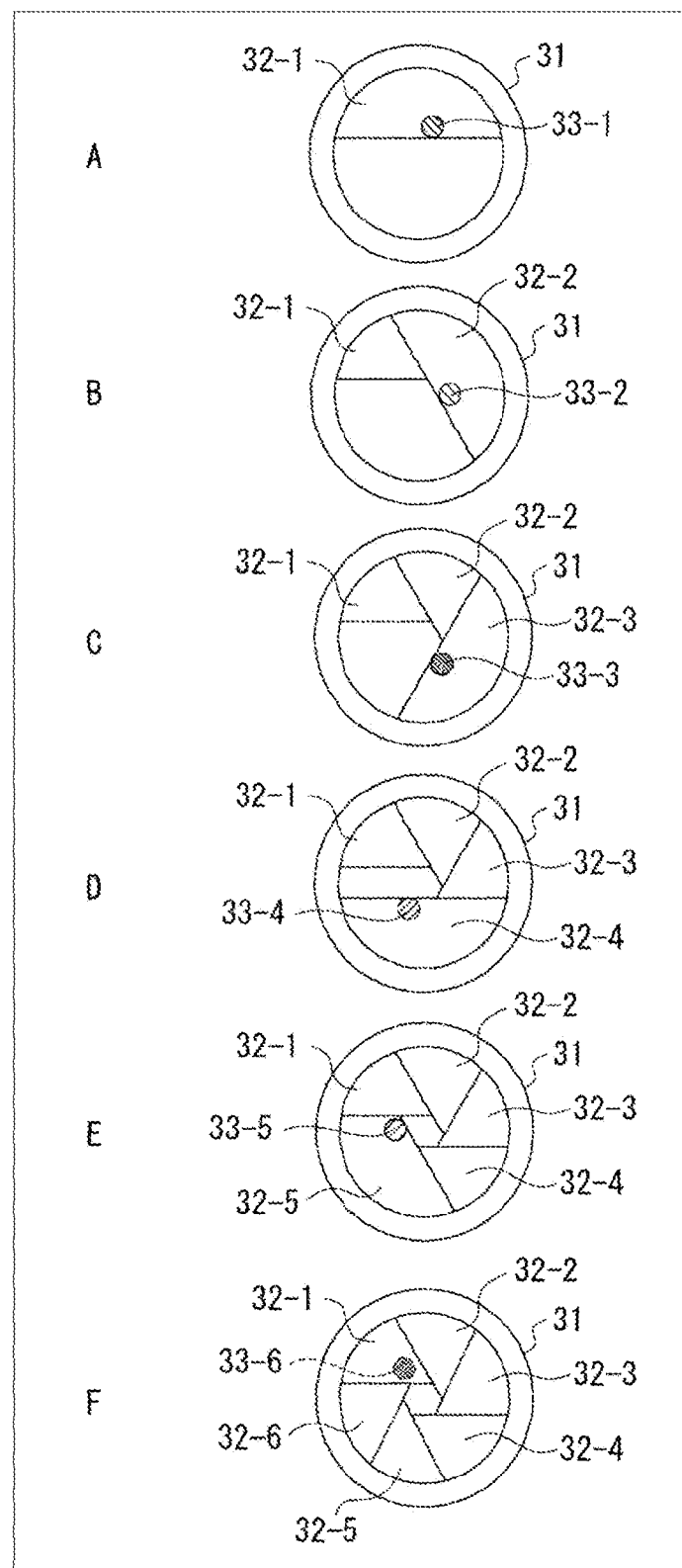
FIG. 3 is a diagram for describing a state where optical filters are hidden by adjacent aperture blades.

With reference to FIG. 3, a state where the optical filter 33 is hidden by an adjacent aperture blade 32 will be described. FIG. 3 shows a state where the aperture blades 32-1 to 32-6 are sequentially disposed one by one at respective positions in the smallest aperture state.

Part A of FIG. 3 shows a state where the aperture blade 32-1 is disposed at a position in the smallest aperture state. Part B of FIG. 3 shows a state where the aperture blades 32-1 and 32-2 are disposed at positions in the smallest aperture state. As shown in part B of FIG. 3, the optical filter 33-1 (part A of FIG. 3) of the aperture blade 32-1 is hidden by the aperture blade 32-2 adjacent to the aperture blade 32-1.

Further, part C of FIG. 3 shows a state where the aperture blades 32-1 to 32-3 are disposed at positions in the smallest aperture state. The optical filter 33-2 (part B of FIG. 3) of the aperture blade 32-2 is hidden by the aperture blade 32-3 adjacent to the aperture blade 32-2. Similarly, part D of FIG. 3 shows a state where the aperture blades 32-1 to 32-4 are disposed at positions in the smallest aperture state. The optical filter 33-3 (part C of FIG. 3) of the aperture blade 32-3 is hidden by the aperture blade 32-4 adjacent to the aperture blade 32-3.

Further, part E of FIG. 3 shows a state where the aperture blades 32-1 to 32-5 are disposed at positions in the smallest aperture state. The optical filter 33-4 (part D of FIG. 3) of the aperture blade 32-4 is hidden by the aperture blade 32-5 adjacent to the aperture blade 32-4. Similarly, part F of FIG. 3 shows a state where the aperture blades 32-1 to 32-6 are disposed at positions in the smallest aperture state. The optical filter 33-5 (part E of FIG. 3) of the aperture blade 32-5 is hidden by the aperture blade 32-6 adjacent to the aperture blade 32-5. Furthermore, the optical filter 33-6 of the aperture blade 32-6 is hidden by the aperture blade 32-1 adjacent to the aperture blade 32-6.

In such a manner, the optical filters 33-1 to 33-6 are hidden during a period from the largest aperture state to the smallest aperture state. When the imaging apparatus 11 performs the normal imaging, with the optical filters 33-1 to 33-6 being hidden, the imaging is performed with the light passing through the aperture. Meanwhile, when the imaging apparatus 11 performs the multispectral imaging, the optical filters 33-1 to 33-6 are sequentially disposed at the aperture in the smallest aperture state, so that the imaging is performed with the light passing through the optical filters 33-1 to 33-6.

Figure 4:
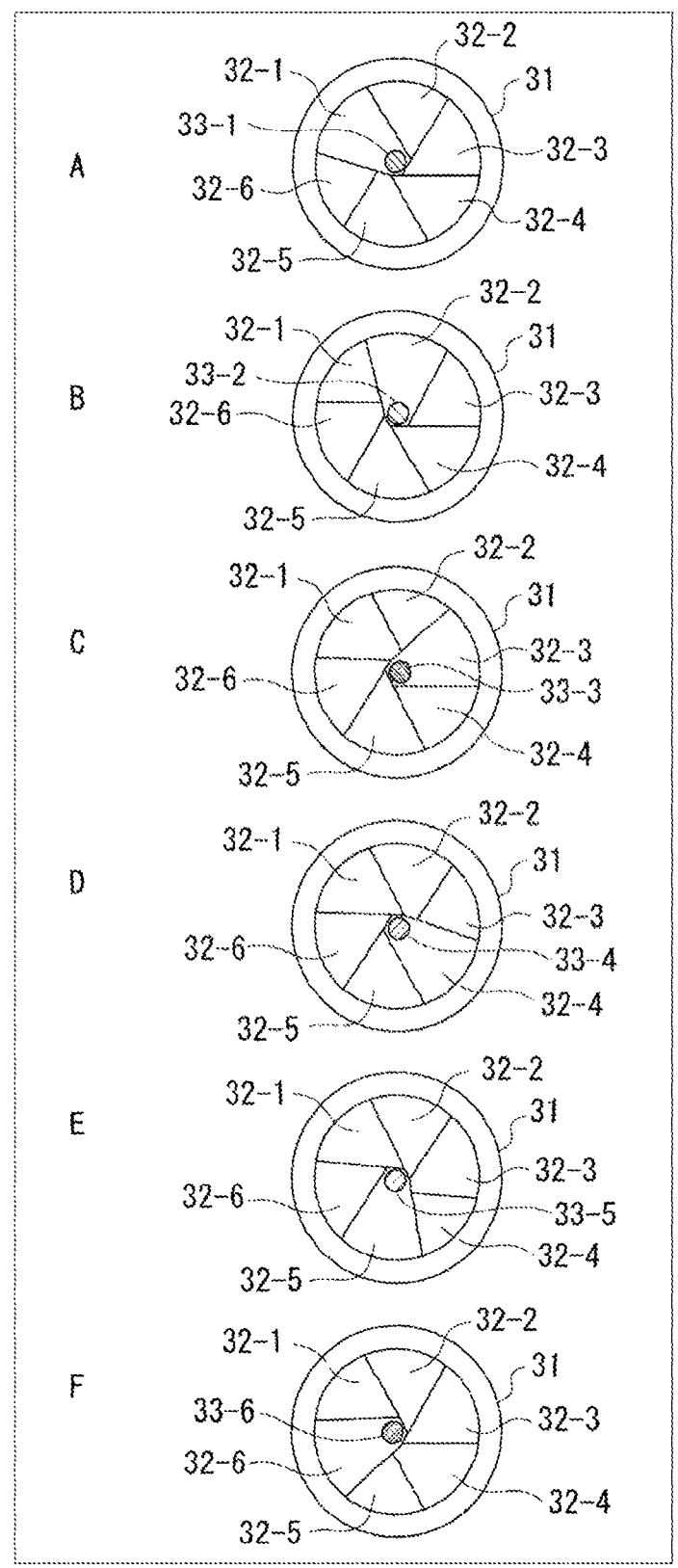
FIG. 4 is a diagram showing a state where the optical filters are sequentially disposed at an aperture in the smallest aperture state in multispectral imaging.

With reference to FIG. 4, a state where the optical filters 33-1 to 33-6 are sequentially disposed at the aperture in the smallest aperture state in the multispectral imaging will be described.

Part A of FIG. 4 shows a state where the aperture blade 32-1 is driven from the smallest aperture state and the optical filter 33-1 is thus disposed at the aperture in the smallest aperture state. Further, part B of FIG. 4 shows a state where the aperture blade 32-2 is driven from the smallest aperture state and the optical filter 33-2 is thus disposed at the aperture in the smallest aperture state. Hereinafter, similarly, part C of FIG. 4 shows a state where the optical filter 33-3 is disposed at the aperture in the smallest aperture state, and part D of FIG. 4 shows a state where the optical filter 33-4 is disposed at the aperture in the smallest aperture state. Further, part E of FIG. 4 shows a state where the optical filter 33-5 is disposed at the aperture in the smallest aperture state, and part F of FIG. 4 shows a state where the optical filter 33-6 is disposed at the aperture in the smallest aperture state.

In such a manner, when the imaging apparatus 11 performs the multispectral imaging, the optical filters 33-1 to 33-6 are sequentially disposed at the aperture in the smallest aperture state, so that images can be captured in a time-division manner with the light in the wavelength ranges passing through the respective optical filters 33-1 to 33-6.

For example, with reference to FIG. 5, the wavelength ranges passing through the respective optical filters 33-1 to 33-6 will be described.

Figure 5:
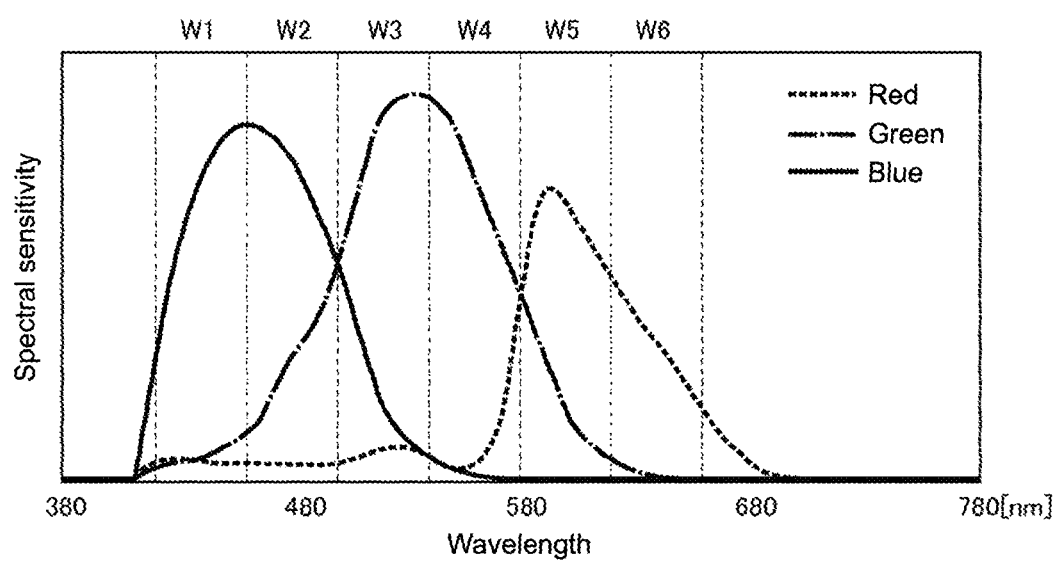
FIG. 5 is a diagram for describing wavelength ranges passing through the respective optical filters.

FIG. 5 shows a spectral sensitivity of differences in sensitivity corresponding to the wavelength of light, in which the horizontal axis represents the wavelength, and the vertical axis represents the spectral sensitivity. FIG. 5 shows peak distributions of sensitivity of red, green, and blue light.

As shown in FIG. 5, the optical filters 33-1 to 33-6 are respectively set to transmit light in wavelength ranges W1 to W6. The wavelength ranges W1 to W6 are obtained when a predetermined range of the visible light range (for example, 380 nm to 780 nm) is divided into six. For example, the optical filter 33-1 transmits light in the wavelength range W1 of approximately 400 nm to 445 nm, the optical filter 33-2 transmits light in the wavelength range W2 of approximately 445 nm to 490 nm, and the optical filter 33-3 transmits light in the wavelength range W3 of approximately 490 nm to 535 nm. Further, the optical filter 33-4 transmits light in the wavelength range W4 of approximately 535 nm to 580 nm, the optical filter 33-5 transmits light in the wavelength range W5 of approximately 580 nm to 625 nm, and the optical filter 33-6 transmits light in the wavelength range W6 of approximately 625 nm to 670 nm.

In such a manner, the imaging apparatus 11 divides the light into the wavelength range W1 to the wavelength range W6 by the optical filters 33-1 to 33-6, so that images can be captured in a time-division manner with the light in the respective wavelength ranges. Specifically, for example, the imaging apparatus 11 can capture images with a higher wavelength resolution than images captured by the normal RGB color filters.

Next, with reference to FIG. 6, the statuses of the iris mechanism 23 will be described.

Figure 6:
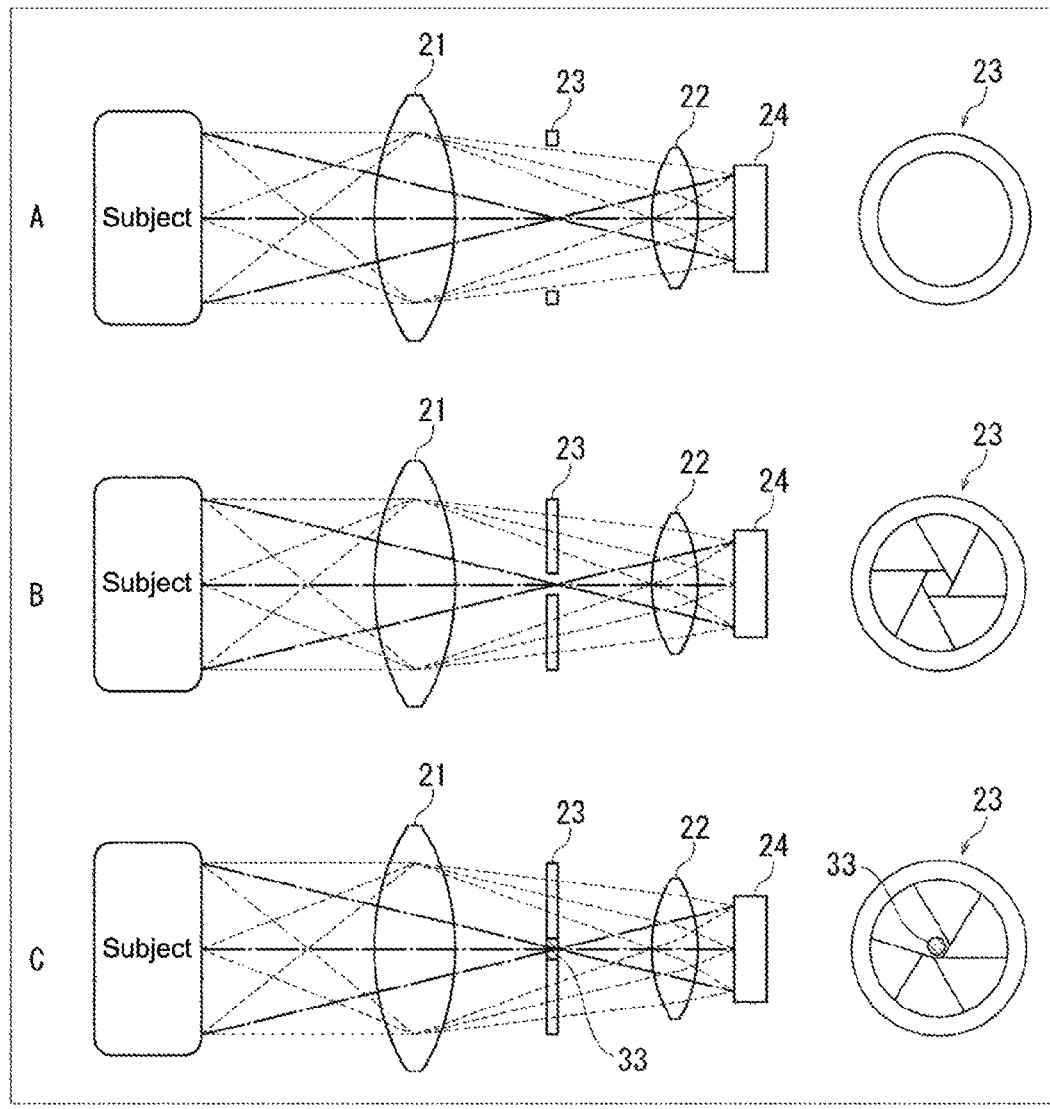
FIG. 6 is a diagram showing statuses of the iris mechanism.

Part A of FIG. 6 shows the iris mechanism 23 in the largest aperture state in which the aperture is opened to be the largest aperture. For example, when the subject is dark, the imaging apparatus 11 sets the iris mechanism 23 to the largest aperture state to perform imaging.

Part B of FIG. 6 shows the iris mechanism 23 in the smallest aperture state in which the aperture is closed to be the smallest aperture. For example, when the subject is sufficiently bright, the imaging apparatus 11 sets the iris mechanism 23 to the smallest aperture state to perform imaging.

Part C of FIG. 6 shows the iris mechanism 23 in a state where a predetermined optical filter 33 is disposed at the aperture in the smallest aperture state. For example, in the multispectral imaging, the imaging apparatus 11 disposes the optical filter 33 at the aperture in the smallest aperture state, to perform imaging.

Figure 7:
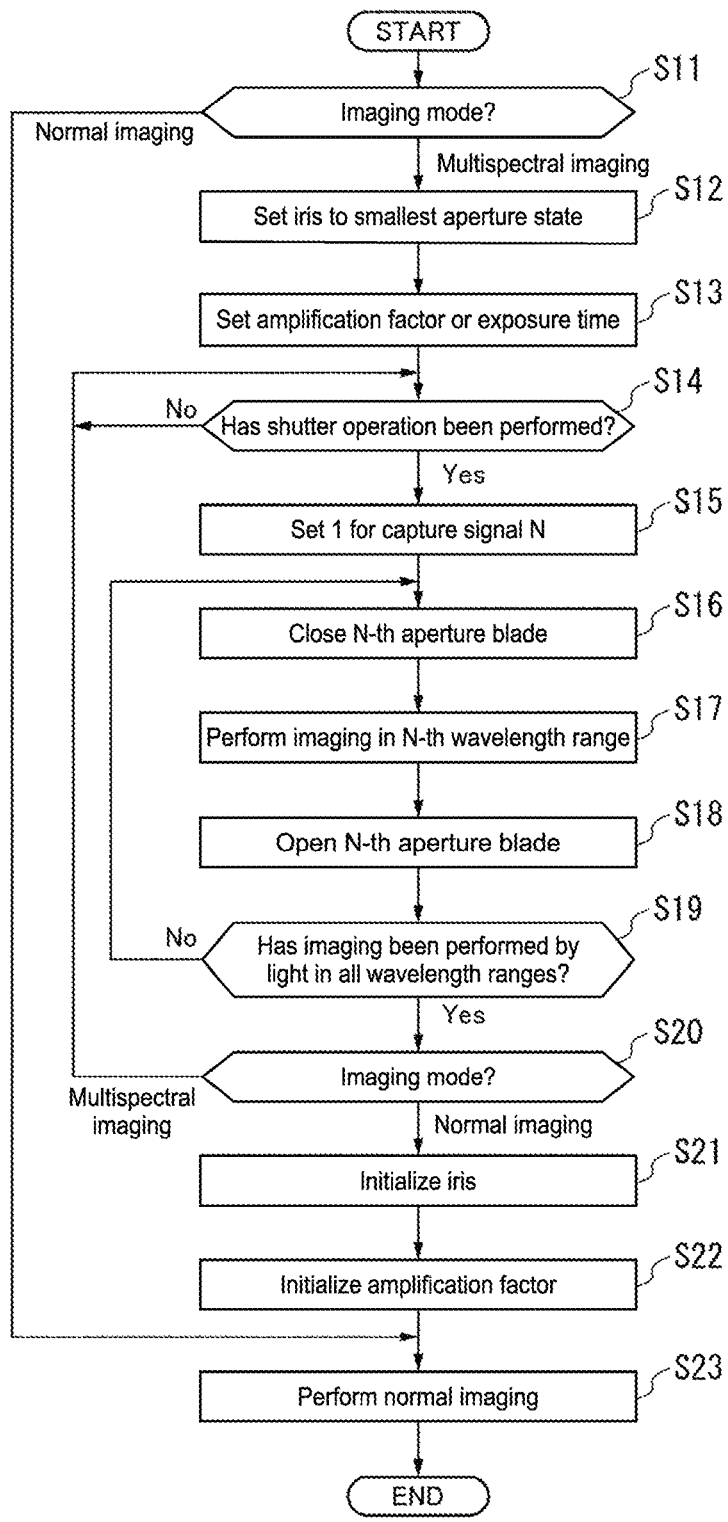
FIG. 7 is a flowchart for describing imaging processing by the imaging apparatus.

Next, FIG. 7 shows a flowchart for describing the imaging processing of the imaging apparatus 11.

For example, when the imaging apparatus 11 is turned on, the processing is started. In Step S11, the control unit 27 determines whether the imaging mode is set to a multispectral imaging mode for performing the multispectral imaging or a normal imaging mode for performing the normal imaging. For example, the user can set the imaging mode by operating an operation unit (not shown).

In Step S11, when the control unit 27 determines that the imaging mode is set to the multispectral imaging mode, the processing proceeds to Step S12. The control unit 27 controls the drive unit 28 to set the iris mechanism 23 to the smallest aperture state. According to this control, the drive unit 28 drives the aperture blades 32-1 to 32-6 of the iris mechanism 23 to set the iris mechanism 23 to the smallest aperture state, as shown in part B of FIG. 6.

In Step S13, the control unit 27 sets the amplification factor of the amplification unit 25 or the exposure time of the image sensor 24 to a value appropriate for the multispectral imaging mode. For example, in the multispectral imaging, the iris mechanism 23 is in the smallest aperture state, and the imaging is performed by the small amount of light passing through the smallest aperture. Thus, a captured image is dark. In this regard, in order that the brightness of the image captured in the multispectral imaging may become appropriate, for example, the control unit 27 sets the amplification factor of the amplification unit 25 to be equal to the brightness of an image captured in the normal imaging, and amplifies the image signals. Specifically, the amplification unit 25 amplifies the image signals such that the signal strength of the image signals is as large as the signal strength of the image signals output in the normal imaging. Further, instead of the amplification by the amplification unit 25, for example, the exposure time of the image sensor 24 may be increased, so that long exposure is set.

In Step S14, the control unit 27 determines whether the user has performed a shutter operation or not, and holds the processing until it is determined that the user has performed a shutter operation. When the user presses down the shutter button and an operation signal thereof is supplied from the operation unit, the control unit 27 determines that a shutter operation has been performed. The processing then proceeds to Step S15.

In Step S15, the control unit 27 sets 1 for a capture signal N. The capture signal N is a parameter that specifies the N-th image of the images captured in the multispectral imaging. For example, when the iris mechanism 23 is provided with the six optical filters 33-1 to 33-6 as shown in FIG. 2, the values 1 to 6 are sequentially set for the capture signal N.

In Step S16, the control unit 27 controls the drive unit 28 to close the N-th aperture blade 32-N of the aperture blades 32-1 to 32-6. According to this control, the drive unit 28 drives the N-th aperture blade 32-N to be closed. As shown in part C of FIG. 6, the optical filter 33-N is disposed at the aperture in the smallest aperture state.

In Step S17, the control unit 27 controls the image sensor 24 to perform imaging. The image sensor 24 performs imaging with light in a wavelength range, which passes through the optical filter 33-N disposed at the aperture of the iris mechanism 23. The amplification unit 25 amplifies the image signals, which are output from the image sensor 24, according to the amplification factor set in Step S13, so that an image captured with the light in the N-th wavelength range is output via the signal processing unit 26.

In Step S18, the control unit 27 controls the drive unit 28 to open the N-th aperture blade 32-N of the aperture blades 32-1 to 32-6. The drive unit 28 drives the N-th aperture blade 32-N to be opened.

In Step S19, the control unit 27 determines whether the imaging has been performed with the light in the wavelength ranges of all the respective optical filters 33-1 to 33-6 or not, that is, whether the imaging is performed by sequentially closing all the aperture blades 32-1 to 32-6.

In Step S19, when determining that the imaging has not been performed with the light in the wavelength ranges of all the respective optical filters 33-1 to 33-6, the control unit 27 increments the capture signal N by 1 (N=N+1). The processing then returns to Step S16. In such a manner, imaging is performed with light of the next wavelength range.

Meanwhile, in Step S19, when the control unit 27 determines that the imaging has been performed with the light in the wavelength ranges of all the respective optical filters 33-1 to 33-6 (for example, in the case where the capture signal N is 6), the processing proceeds to Step S20. Specifically, in this case, six multispectral images are captured with the light in the wavelength ranges of all the respective optical filters 33-1 to 33-6.

In Step S20, the control unit 27 determines whether the imaging mode is set to the multispectral imaging mode or the normal imaging mode. In Step S20, when the control unit 27 determines that the imaging mode is set to the multispectral imaging mode, the processing returns to Step S14, and the similar processing is then repeated.

Meanwhile, in Step S20, when the control unit 27 determines that the imaging mode is set to the normal imaging mode, the processing proceeds to Step S21. The control unit 27 controls the drive unit 28 to initialize the iris mechanism 23. The drive unit 28 thus cancels the smallest aperture state of the iris mechanism 23, which is set in Step S12, and the iris mechanism 23 is controlled to have an aperture corresponding to the brightness of the subject in the normal imaging.

In Step S22, the control unit 27 initializes the amplification factor of the amplification unit 25. The amplification unit 25 thus cancels the amplification factor, which is set in Step S13. The amplification unit 25 is controlled to have an amplification factor corresponding to the brightness of the subject in the normal imaging.

After the processing of Step S22 or when the control unit 27 determines in Step S11 that the imaging mode is set to the normal imaging mode, the processing proceeds to Step S23. The control unit 27 controls the blocks of the imaging apparatus 11 to perform the normal imaging. Specifically, according to the brightness of the subject, the size of the aperture of the iris mechanism 23 is appropriately controlled, the exposure time of the image sensor 24 is controlled, and the amplification factor of the amplification unit 25 is controlled, so that imaging is performed. After the processing of Step S23, the processing is then terminated.

As described above, the imaging apparatus 11 can switch between the multispectral imaging mode and the normal imaging mode to perform imaging. The multispectral imaging enables the optical filters 33-1 to 33-6 to be sequentially disposed at the aperture in the smallest aperture state at predetermined timings, to capture multispectral images in a time-division manner with the light passing through the respective optical filters 33-1 to 33-6. At that time, the multispectral images are captured with light having the wavelength characteristics acquired by superimposing wavelength characteristics of the color filters of the three primary colors, which are disposed on a pixel-by-pixel-basis on the light-receiving surface of the image sensor 24, and wavelength characteristics of the optical filters 33-1 to 33-6.

Further, multispectral images are captured through the aperture in the smallest aperture state. Thus, in the light from the subject, light having an large incident angle (high NA (Numerical Aperture)) with respect to the normal line of the optical filter 33 is blocked, and light having a small incident angle (low NA) with respect to the normal line of the optical filter 33 is caused to pass through the optical filter 33, so that the influence of the incident angle dependence of the optical filter 33 can be reduced. This configuration can improve the wavelength precision.

Further, the imaging apparatus 11 amplifies the image signals by the amplification unit 25 and can thus output image signals having a signal strength equal to a signal strength in the normal imaging. It should be noted that in the imaging apparatus 11, in addition to increasing the amplification factor of the amplification unit 25, for example, prolonging the exposure time of the image sensor 24 and increasing the image signals as frame integration makes it possible to output the image signals having a signal strength equal to a signal strength in the normal imaging.

Further, for example, compared with an imaging apparatus in the related art, the imaging apparatus 11 can achieve multispectral imaging by only providing the optical filters 33-1 to 33-6 to the aperture blades 32-1 to 32-6 of the iris mechanism 23, without a need for adding new mount components. Thus, the imaging apparatus 11 can achieve multispectral imaging in a small mechanism, compared with an imaging apparatus achieving multispectral imaging by using image sensors to perform imaging with light divided with a beam splitter, for example.

It should be noted that the imaging apparatus 11 has a configuration including the six optical filters 33-1 to 33-6, but the number of optical filters 33 is not limited to six. The number of optical filters 33 may be at least three (more than the case of normal RGB) or may be six or more or six or less. Further, all the aperture blades 32-1 to 32-6 are not necessarily provided with the optical filters 33. The number of aperture blades 32 and the number of optical filters 33 may differ. For example, the following configurations can be adopted: in the six aperture blades 32-1 to 32-6, four or five aperture blades are provided with optical filters 33; and a single aperture blade 32 is provided with a plurality of optical filters 33.

Further, the optical filters 33 can be set so as to, in addition to transmitting the above-mentioned light in the wavelength ranges of the visible light as shown in FIG. 5, transmit light in a wavelength range other than the visible light (for example, infrared light).

Furthermore, the image sensor 24 can have a configuration in which the color filters of the three primary colors as described above are not disposed on a pixel-by-pixel-basis. Specifically, in this case, the image sensor 24 has a configuration of detecting only luminance signals, and can capture images with light having the wavelength characteristics of the optical filters 33-1 to 33-6 disposed at the aperture of the iris mechanism 23.

Figure 8:
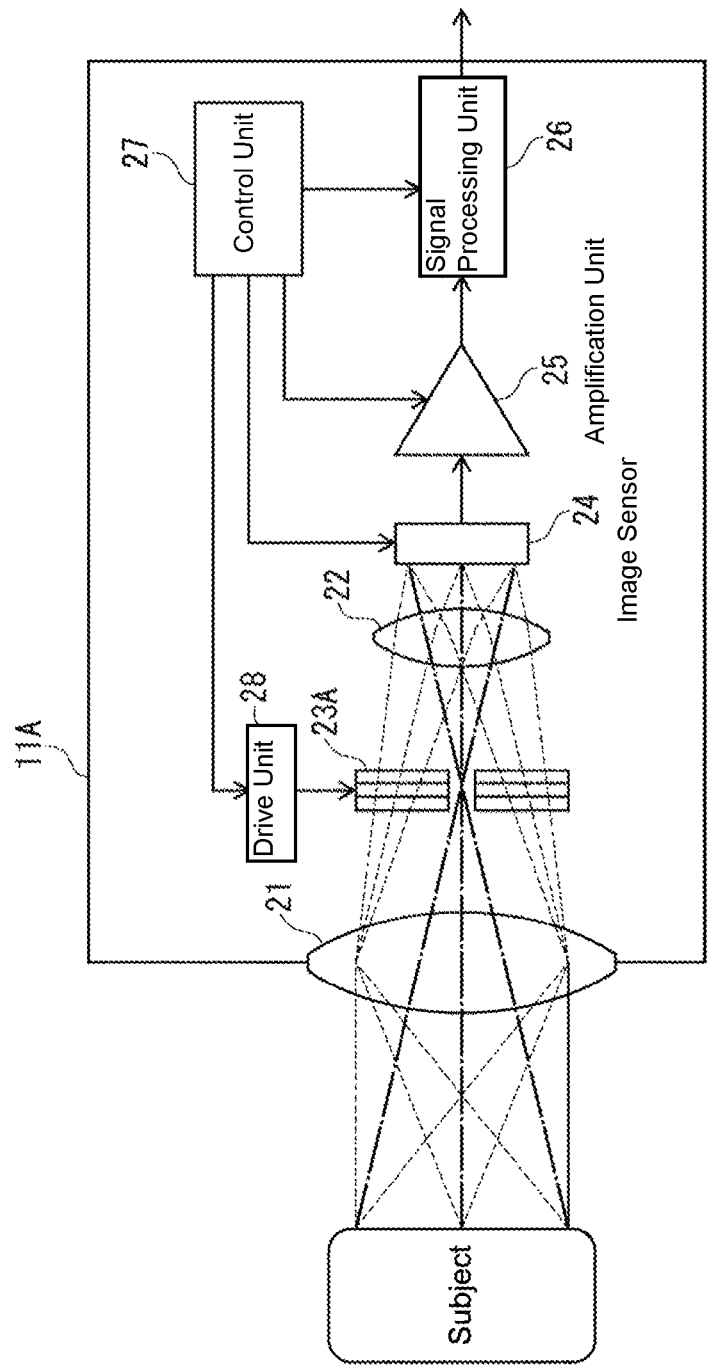
FIG. 8 is a block diagram showing a configuration example of a second embodiment of the imaging apparatus, to which the present technology is applied.

Next, FIG. 8 is a block diagram showing a configuration example of a second embodiment of the imaging apparatus to which the present technology is applied.

In an imaging apparatus 11A shown in FIG. 8, common configurations with the imaging apparatus 11 of FIG. 1 will be denoted by the same reference symbols and detailed description thereof will be omitted. Specifically, the imaging apparatus 11A has configurations in common with the imaging apparatus 11 of FIG. 1 in that the imaging apparatus 11A includes a first optical system 21, a second optical system 22, an image sensor 24, an amplification unit 25, a signal processing unit 26, a control unit 27, and a drive unit 28. However, the imaging apparatus 11A is different from the imaging apparatus 11 of FIG. 1 in that the imaging apparatus 11A includes an iris mechanism 23A.

The iris mechanism 23A is disposed between the first optical system 21 and the second optical system 22. Similarly to the iris mechanism 23 of FIG. 1, the iris mechanism 23A restricts the amount of light passing through the optical system. The iris mechanism 23 of FIG. 1 includes the six aperture blades 32-1 to 32-6, whereas the iris mechanism 23A includes 18 aperture blades 32-1 to 32-18 by superimposition of three iris mechanisms 23.

Figure 9:
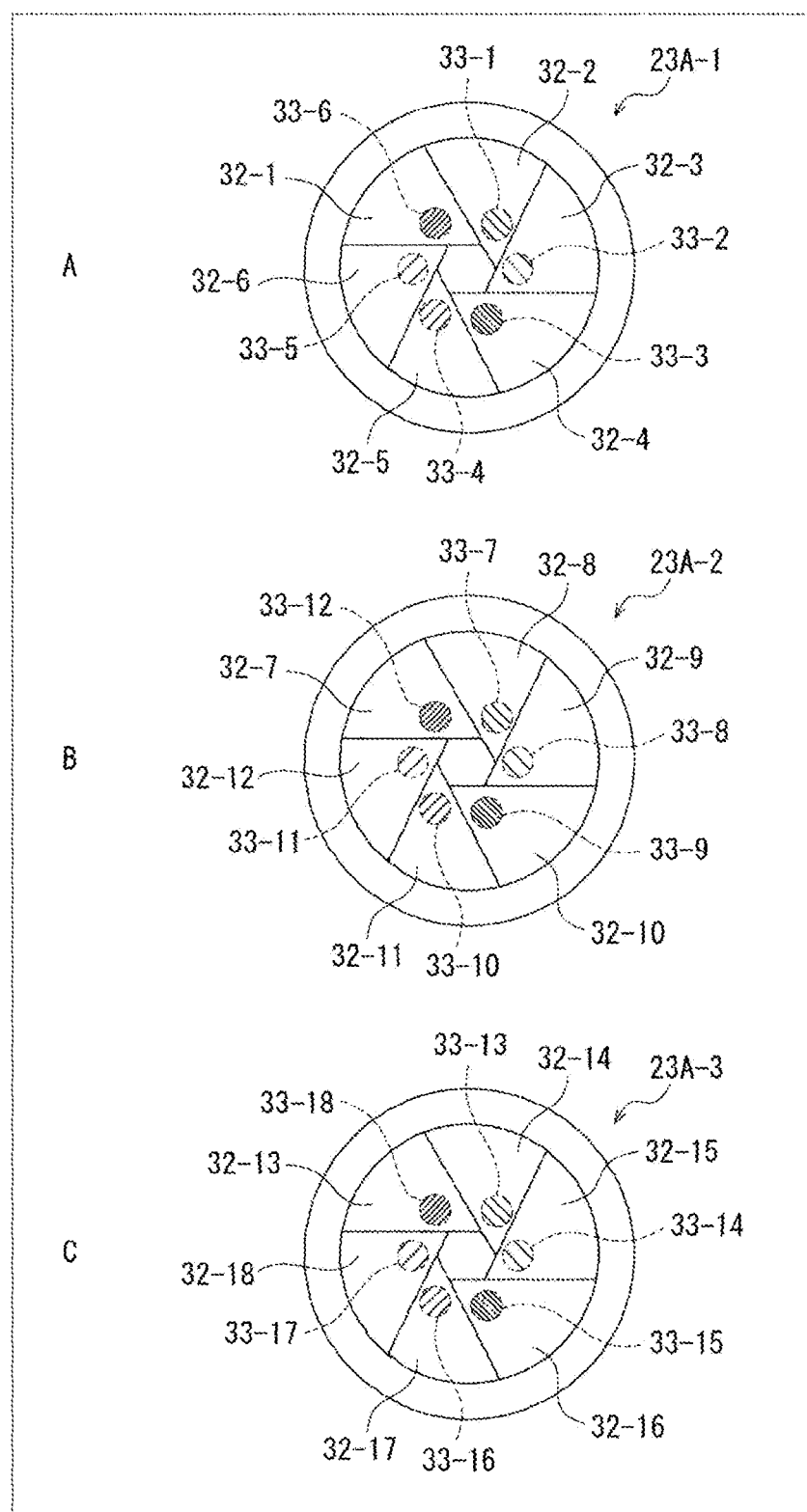
FIG. 9 is a diagram showing a configuration of an iris mechanism.

Specifically, the iris mechanism 23A includes a first iris mechanism part 23A-1, a second iris mechanism part 23A-2, and a third iris mechanism part 23A-3 as shown in FIG. 9, which are superimposed in an optical axis direction. The first iris mechanism part 23A-1, the second iris mechanism part 23A-2, and the third iris mechanism part 23A-3 are each configured to be similar to the iris mechanism 23 (FIG. 2).

In other words, the first iris mechanism part 23A-1 shown in part A of FIG. 9 includes six aperture blades 32-1 to 32-6 respectively provided with six optical filters 33-1 to 33-6. Further, the second iris mechanism part 23A-2 shown in part B of FIG. 9 includes six aperture blades 32-7 to 32-12 respectively provided with six optical filters 33-7 to 33-12. Furthermore, the third iris mechanism part 23A-3 shown in part C of FIG. 9 includes six aperture blades 32-13 to 32-18 respectively provided with six optical filters 33-13 to 33-18.

In the iris mechanism 23A, when the aperture is in the smallest aperture state, the aperture blades 32-1 to 32-18 are sequentially independently driven, and the optical filters 33-1 to 33-18 are disposed at the aperture in the smallest aperture state. Further, the optical filters 33-1 to 33-18 each transmit light in different wavelength ranges.

Thus, the imaging apparatus 11A performs imaging with light passing through the respective optical filters 33-1 to 33-18. This enables multispectral images to be captured with the light in respective narrow wavelength ranges.

The embodiment described above has described the configuration in which the aperture blades 32 of the iris mechanism 23 are provided with the optical filters 33. For example, the multispectral imaging may be performed using a configuration in which a normal iris mechanism and an optical filter changer are combined.

Figure 10:
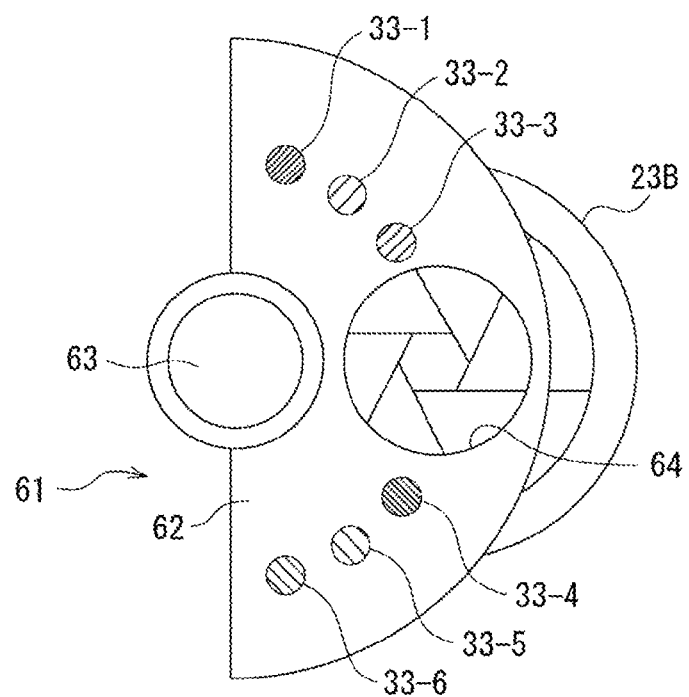
FIG. 10 is a diagram showing a first configuration example of an optical filter changer.
Figure 11:
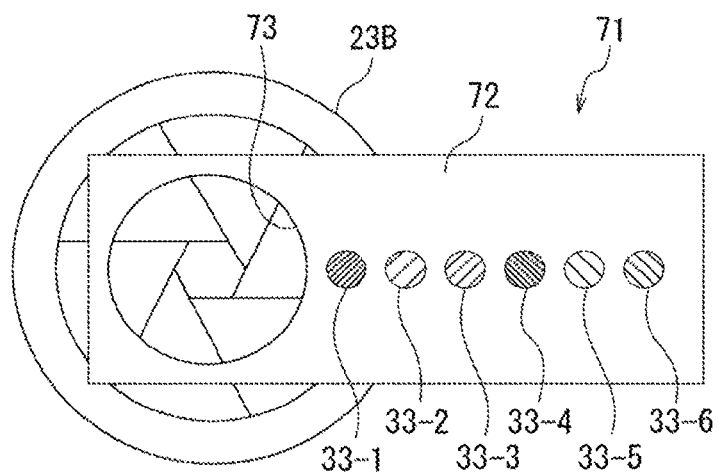
FIG. 11 is a diagram showing a second configuration example of the optical filter changer.

FIGS. 10 and 11 each show a configuration example in which a normal iris mechanism and an optical filter changer are combined.

In a first configuration example of FIG. 10, a normal iris mechanism 23B and a rotary optical filter changer 61 are combined.

The normal iris mechanism 23B, which is different from the iris mechanism 23 described above, does not include the optical filters 33-1 to 33-6. The optical filter changer 61 is configured such that a turret 62 including the optical filters 33-1 to 33-6 is rotatable about a rotary part 63. In the multispectral imaging, the optical filters 33-1 to 33-6 are sequentially disposed at the aperture of the normal iris mechanism 23B by the rotation of the turret 62, so that imaging can be performed with light passing through the respective optical filters 33-1 to 33-6. Further, the turret 62 includes a large aperture part 64. In the normal imaging, the large aperture part 64 is disposed on the optical axis.

In a second configuration example shown in FIG. 11, the normal iris mechanism 23B and a sliding optical filter changer 71 are combined.

The normal iris mechanism 23B, which is different from the iris mechanism 23 described above, does not include the optical filters 33-1 to 33-6. The optical filter changer 71 is configured such that a plate 72 including the optical filters 33-1 to 33-6 is slidable. In the multispectral imaging, the optical filters 33-1 to 33-6 are sequentially disposed at the aperture of the normal iris mechanism 23B by the slide of the plate 72, so that imaging can be performed with light passing through the respective optical filters 33-1 to 33-6. Further, the plate 72 includes a large aperture part 73. In the normal imaging, the large aperture part 73 is disposed on the optical axis.

It should be noted that the processing described with reference to the flowchart described above are not necessarily processed chronologically along the order described in the flowchart, and also include processing executed in parallel or individually (for example, parallel processing or processing by an object). Further, a program may be processed by a single CPU or distributed and processed by a plurality of CPUs.

Further, the series of processing described above (imaging method) can be executed by hardware or software. In a case where the series of processing is executed by software, programs constituting the software are installed from a program recording medium, on which programs are recorded, in a computer built in dedicated hardware, a general-purpose personal computer capable of executing various functions by installing various programs, and other computers.

For example, the control unit 27 of FIG. 1 includes a CPU (Central Processing Unit), a ROM (Read Only Memory), a RAM (Random Access Memory), and a storage unit such as a non-volatile memory. A program stored in the ROM or the storage unit is loaded to the RAM and executed by the CPU, so that the series of processing described above is performed. Further, the program can be previously stored in the storage unit, or can also be downloaded via a communication unit or a removable medium and then installed in the storage unit or updated.

It should be noted that the present technology can have the following configurations.

(1) An imaging apparatus, including:
   an image sensor that captures an image of a subject;
   an optical system that forms an image on the image sensor with light from the subject; and
   an iris mechanism that restricts the amount of light passing through the optical system, the iris mechanism including
   aperture blades that adjust a size of an aperture causing the light from the subject to pass through the aperture, and
   an optical filter that is provided to at least one of the aperture blades and transmits light having a predetermined wavelength,
   the aperture blades being driven to positions where the aperture has a predetermined size, in a state where the optical filter provided to the at least one of the aperture blades is hidden by one of the aperture blades other than the aperture blade of the optical filter,
   the aperture blades provided with predetermined optical filters being driven such that the predetermined optical filters sequentially cover the aperture at predetermined timings.

(2) The imaging apparatus according to (1), in which
   in the smallest aperture state where the aperture formed by the aperture blades of the iris mechanism is closed to be the smallest aperture, the optical filters are sequentially disposed at the aperture to perform multispectral imaging in which images are captured in a time-division manner with light passing through the optical filters.

(3) The imaging apparatus according to (2), further including:
   an amplification unit that amplifies an image signal, the image signal being output after the image sensor captures the image of the subject, the amplification unit amplifying the image signal such that a signal strength of the image signal output in the multispectral imaging is as large as a signal strength of the image signal output when imaging other than the multispectral imaging is performed.

(4) The imaging apparatus according to (2), in which
   the image sensor increases an exposure time with the light from the subject such that a signal strength of the image signal output in the multispectral imaging is as large as a signal strength of the image signal output when imaging other than the multispectral imaging is performed.

(5) The imaging apparatus according to any one of (1) to (4), in which
   a normal imaging mode for capturing an image with light not passing through the optical filter of the iris mechanism and a multispectral imaging mode for capturing images with light passing through the respective optical filters of the iris mechanism are switched.

(6) The imaging apparatus according to any one of (1) to (5), in which
   the iris mechanism includes iris mechanism parts superimposed in an optical axis direction of the optical system, the iris mechanism parts each including aperture blades that adjust the size of the aperture causing the light from the subject to pass through the aperture, and an optical filter that is provided to at least one of the aperture blades and transmits light having a predetermined wavelength.

(7) The imaging apparatus according to any one of (1) to (6), in which the image sensor includes color filters of three primary colors, the color filters being disposed in a predetermined array for each of pixels disposed on a light-receiving surface receiving the light from the subject, and the image sensor captures images with light having wavelength characteristics acquired by superimposition on wavelength characteristics of the optical filters disposed at the aperture.

(8) The imaging apparatus according to any one of (1) to (6), in which the image sensor captures images with light having wavelength characteristics of the optical filters disposed at the aperture.

(9) The imaging apparatus according to any one of (1) to (8), in which the iris mechanism includes at least three optical filters, to perform imaging with light divided into at least three wavelength ranges.

(10) The imaging apparatus according to any one of (1) to (9), in which the optical filter transmits light in a smaller wavelength range than wavelength ranges of light passing through respective color filters of three primary colors, the color filters being disposed on a light-receiving surface of the image sensor.

(11) The imaging apparatus according to any one of (1) to (10), in which the optical filter transmits light in a wavelength range of visible light or light in a specific wavelength range in wavelength ranges other than the visible light.

(12) An iris device, which restricts the amount of light passing through an optical system of an imaging apparatus, the imaging apparatus including an image sensor that captures an image of a subject and the optical system that forms an image on the image sensor with light from the subject, the iris device including:

aperture blades that adjust a size of an aperture causing the light from the subject to pass through the aperture; and an optical filter that is provided to at least one of the aperture blades and transmits light having a predetermined wavelength, the aperture blades being driven to positions where the aperture has a predetermined size, in a state where the optical filter provided to the at least one of the aperture blades is hidden by one of the aperture blades other than the aperture blade of the optical filter, the aperture blades provided with predetermined optical filters being driven such that the predetermined optical filters sequentially cover the aperture at predetermined timings.

(13) An imaging method for an imaging apparatus including an image sensor that captures an image of a subject, an optical system that forms an image on the image sensor with light from the subject, and an iris mechanism that restricts the amount of light passing through the optical system, the iris mechanism including aperture blades that adjust a size of an aperture causing the light from the subject to pass through the aperture, and an optical filter that is provided to at least one of the aperture blades and transmits light having a predetermined wavelength, the imaging method including the steps of:

driving the aperture blades to positions where the aperture has a predetermined size, in a state where the optical filter provided to the at least one of the aperture blades is hidden by one of the aperture blades other than the aperture blade of the optical filter; and driving the aperture blades provided with predetermined optical filters such that the predetermined optical filters sequentially cover the aperture at predetermined timings.

(14) A program causing a computer to execute processing, the computer controlling an imaging apparatus including an image sensor that captures an image of a subject, an optical system that forms an image on the image sensor with light from the subject, and an iris mechanism that restricts the amount of light passing through the optical system, the iris mechanism including aperture blades that adjust a size of an aperture causing the light from the subject to pass through the aperture, and an optical filter that is provided to at least one of the aperture blades and transmits light having a predetermined wavelength, the processing including the steps of:

driving the aperture blades to positions where the aperture has a predetermined size, in a state where the optical filter provided to the at least one of the aperture blades is hidden by one of the aperture blades other than the aperture blade of the optical filter; and driving the aperture blades provided with predetermined optical filters such that the predetermined optical filters sequentially cover the aperture at predetermined timings.

It should be noted that embodiments of the present disclosure are not limited to the embodiments described above, and can be variously modified without departing from the gist of the present disclosure.

DESCRIPTION OF SYMBOLS 11 imaging apparatus
21 first optical system
22 second optical system
23 iris mechanism
24 image sensor
25 amplification unit
26 signal processing unit
27 control unit
28 drive unit
31 iris outer frame
32-1 to 32-6 aperture blade
33-1 to 33-6 optical filter
61 optical filter changer
62 turret
63 rotary part
64 large aperture part
71 optical filter changer
72 plate
73 large aperture part

The invention claimed is:
1. An imaging apparatus, comprising:
an optical system comprising a plurality of lenses configured to: receive light from a subject; and condense the received light;
a central processing unit (CPU);
an iris mechanism configured to control an amount of the condensed light from the optical system, wherein the iris mechanism includes:

a plurality of aperture blades configured to adjust a size of an aperture, based on a first control signal from the CPU, such that the condensed light passes through the aperture, and a plurality of optical filters, corresponding to each of the plurality of aperture blades, wherein the plurality of optical filters are configured to transmit the condensed light having a particular wavelength, wherein positions of the plurality of aperture blades are controlled such that a particular size of the aperture is obtained, wherein the positions of the plurality of aperture blades are controlled in a state where one of the plurality of optical filters, corresponding to a first aperture blade of the plurality of aperture blades, is completely hidden by a second aperture blade of the plurality of aperture blades, and wherein the plurality of aperture blades, corresponding to particular optical filters of the plurality of optical filters, are controlled such that the particular optical filters of the plurality of optical filters sequentially cover the aperture at particular time instances; and an image sensor configured to capture an image based on the condensed light from the plurality of optical filters.

2. The imaging apparatus according to claim 1, wherein a smallest aperture state, from a plurality of aperture states, is obtained based on the positions of the plurality of aperture blades, and wherein the plurality of optical filters are sequentially present at the aperture, in the smallest aperture state, such that the image is captured in time-division manner, based on a multispectral imaging mode, with the condensed light from the plurality of optical filters.

3. The imaging apparatus according to claim 2, wherein the image sensor is further configured to generate an image signal based on the captured image; and the imaging apparatus further comprising:

an amplifier configured to amplify the image signal such that a first signal strength of the image signal, output in the multispectral mode, is equivalent to a second signal strength of the image signal, output in an imaging technique other than the multispectral imaging mode, wherein the image signal is amplified based on a second control signal from the CPU.

4. The imaging apparatus according to claim 2, the image sensor is further configured to increase an exposure time associated with the condensed light such that a first signal strength of an image signal, output in the multispectral imaging mode, is equivalent to a second signal strength of the image signal, output in an imaging technique other than the multispectral imaging mode, and wherein the exposure time is increased based on a third control signal from the CPU.

5. The imaging apparatus according to claim 1, wherein the image sensor is configured to capture the image in one of a normal imaging mode or a multispectral imaging mode based on a second control signal from the CPU, wherein, in the normal imaging mode, the iris mechanism lacks the plurality of optical filters, and wherein, in the multispectral imaging mode, the condensed light from the plurality of optical filters.

6. The imaging apparatus according to claim 1, wherein the iris mechanism includes a plurality of iris mechanism parts that are superimposed in an optical axis direction of the optical system, wherein each of the plurality of iris mechanism parts includes:

the plurality of aperture blades, and the plurality of optical filters.

7. The imaging apparatus according to claim 1, wherein the image sensor includes a plurality of color filters of three primary colors, in a particular array for each of pixels, on a light-receiving surface, and the image sensor is configured to capture the image with the condensed light having wavelength characteristics of the plurality of color filters acquired by superimposition of the wavelength characteristics of the plurality of color filters on wavelength characteristics of the plurality of optical filters.

8. The imaging apparatus according to claim 1, wherein the image sensor is configured to capture the image with the condensed light having wavelength characteristics of the plurality of optical filters.

9. The imaging apparatus according to claim 1, wherein the iris mechanism includes at least three optical filters of the plurality of optical filters to capture the image with the condensed light divided into at least three wavelength ranges.

10. The imaging apparatus according to claim 1, wherein the plurality of optical filters are configured to transmit the condensed light in a smaller wavelength range than wavelength ranges of the condensed light from a plurality of color filters of three primary colors, wherein the plurality of color filters are present on a light-receiving surface of the image sensor.

11. The imaging apparatus according to claim 1, wherein the plurality of optical filters are configured to transmit the condensed light in a wavelength range of visible light or a particular wavelength range other than the visible light.

12. An iris device, comprising:

a plurality of aperture blades configured to adjust a size of an aperture, based on a control signal from a central processing unit (CPU), such that light from a subject passes through the aperture; and a plurality of optical filters corresponding to at least one of the plurality of aperture blades, wherein the plurality of optical filters are configured to transmit the light having a particular wavelength, wherein positions of the aperture blades are controlled, based on the control signal from the CPU, such that a particular size of the aperture is obtained, wherein the positions of the plurality of aperture blades are controlled in a state where one of the plurality of optical filters, corresponding to a first aperture blade of the plurality of aperture blades, is completely hidden by a second aperture blade of the plurality of aperture blades, and wherein the plurality of aperture blades, corresponding to particular optical filters of the plurality of optical filters, are controlled such that the particular optical filters of the plurality of filters sequentially cover the aperture at particular time instances.

13. A method comprising:

in an iris mechanism of an imaging apparatus:

controlling positions of a plurality of aperture blades, based on a control signal from a central processing unit (CPU), such that a particular size of an aperture is obtained to pass light, from a subject, through the aperture, wherein the positions of the plurality of aperture blades are controlled in a state where one of a plurality of optical filters, corresponding to a first aperture blade of the plurality of aperture blades, is completely hidden by a second aperture blade of the plurality of aperture blades, and controlling the plurality of aperture blades, corresponding to particular optical filters of the plurality of optical filters, such that the particular optical filters of the plurality of filters sequentially cover the aperture at particular timings.

14. A non-transitory computer readable medium having stored thereon computer-readable instructions, which when executed by a computer, cause the computer to execute operations, the operations comprising:

controlling positions of a plurality of aperture blades, based on a control signal from a central processing unit (CPU), such that a particular size of an aperture is obtained to pass light, from a subject, through the aperture, wherein the positions of the plurality of aperture blades are controlled in a state where one of a plurality of optical filters, corresponding to a first aperture blade of the plurality of aperture blades, is completely hidden by a second aperture blade of the plurality of aperture blades, and controlling the plurality of aperture blades, corresponding to particular optical filters of the plurality of optical filters, such that the particular optical filters of the plurality of optical filters sequentially cover the aperture at particular timings.

* * * * *